UNITED STATES PATENT OFFICE.

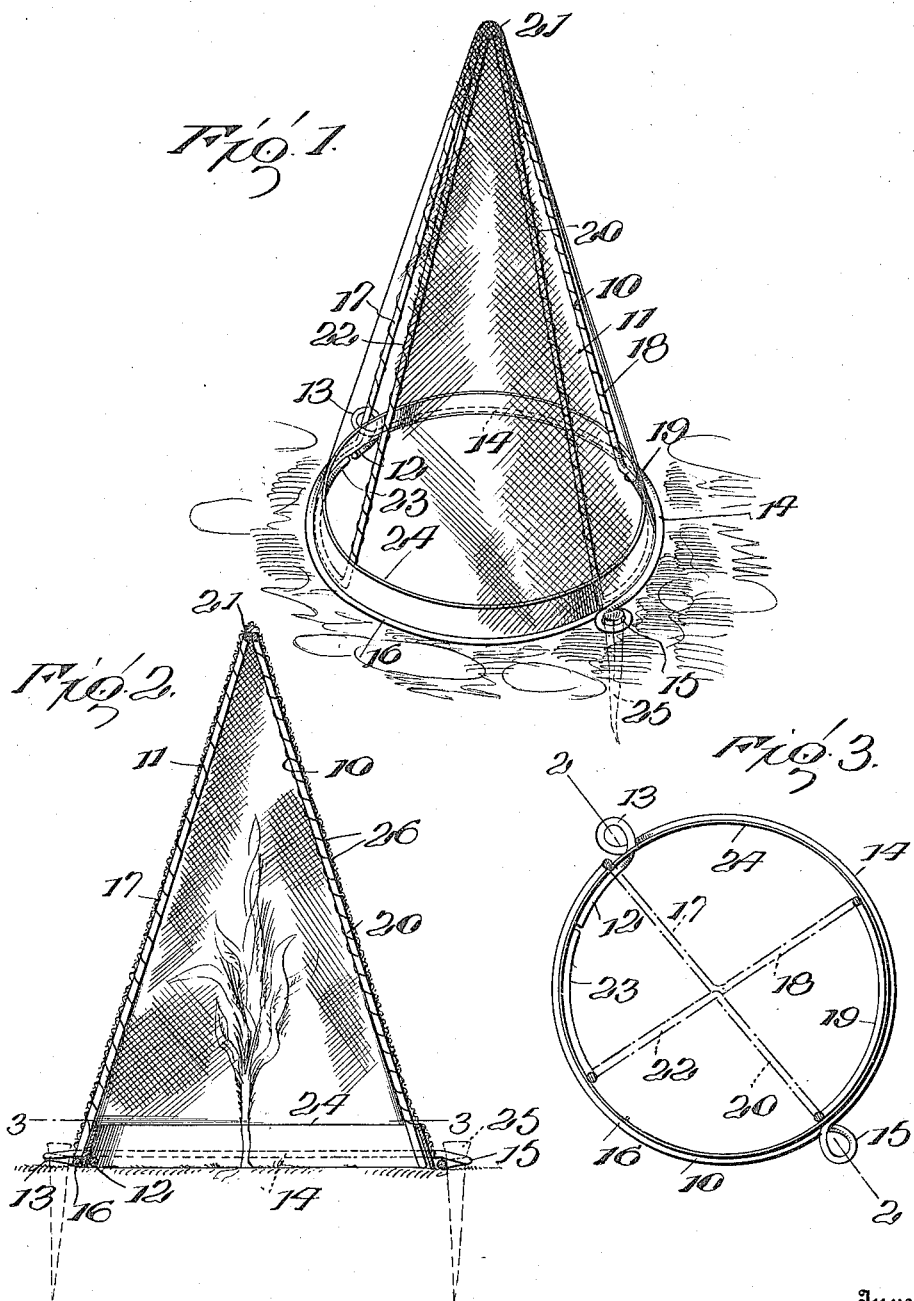

WILLIAM H. DENKER, OF SAN JOSE, CALIFORNIA.

PLANT-PROTECTOR.

1,161,380.  Specification of Letters Patent.  Patented Nov. 23, 1915.

Original application filed September 15, 1914, Serial No. 861,842. Divided and this application filed January 4, 1915. Serial No. 445.

*To all whom it may concern:*

Be it known that I, WILLIAM H. DENKER, a citizen of the United States, residing at San Jose, in the county of Santa Clara and State of California, have invented certain new and useful Improvements in Plant-Protectors, of which the following is a specification.

My invention relates to new and useful improvements in plant protectors, the primary object of my invention being the provision of a protective housing of foraminous or other suitable material supported by a light framework and capable of being positioned about a plant to keep away slugs, insects and rodents. Furthermore, the protector, if covered with cloth or paper, may be employed to protect the plants from the direct rays of the sun or at night from frost.

More specifically, one of the chief objects of my present invention consists in the construction of the supporting frame of the housing in a simple and economical manner and in such shape and proportions that one housing may be nested within another when not in use to occupy as little space as possible.

A further object of my invention consists in the provision of a simple and efficient means for preventing displacement of the housings in use.

With these and other objects in veiw, my invention will be more fully described, illustrated in the accompanying drawing, and then more specifically pointed out in the claim which is attached to and forms a part of this application.

In the drawing: Figure 1 is a perspective view of the preferred embodiment of my invention; Fig. 2 is a vertical sectional view taken on the line 2—2 of Fig. 3; Fig. 3 is a horizontal sectional view taken on the line 3—3 of Fig. 2.

Corresponding and like parts are referred to in the following description and indicated in all the views of the drawing by the same reference characters.

As previously stated, my invention consists primarily of a framework, indicated as a whole by the numeral 10, which supports a covering 11 of any suitable material, preferably wire netting. The framework 10 is preferably formed from a single length of relatively stiff, although light, resilient wire bent, as will be more fully explained, to provide a circular bottom portion and a conical upper portion, whereby a conical frame for the support of the netting is formed. The length of wire forming this frame has one end portion 12 curved somewhat and then bent to form an eye 13, after which it is bent into a semicircle 14 and further bent to provide a second eye 15 diametrically opposite the eye 13. The wire is then bent as shown at 16 to complete the circular base, extending to the eye 13 and then being directed upwardly and inwardly as shown at 17 and downwardly and outwardly as shown at 18 to the portion 14 of the base at a point substantially midway between the eyes 13 and 14. From this point, it is extended, always in close engagement with the base portion 14, as shown at 19, to a point adjacent the eye 15, then upwardly and inwardly as shown at 20 and downwardly by the bight portion 21 connecting the portions 17 and 18, as shown at 22, to the base portion 16, preferably at a point substantially diametrically opposite the lower end of the portion 18, being then curved and extended in close engagement with such base portion as shown at 23 until its free end meets the free end portion 12. The frame thus formed is covered, save at its bottom, with the netting 11 and its base is reinforced by an annular strip 24 of sheet metal disposed on edge, certain of its edge portions seating between the portions 14 and 19 and between the portions 12, 13 and and the portion 16. The eyes 13 and 15 are adapted to receive anchoring stakes 25 when the protective housing is in use, these stakes serving to prevent the housing from displacement and to hold it with its lower edge in close engagement with the ground. Inasmuch as this housing is conical in shape, it will be clearly apparent that a number of housings of this form may be readily nested when not in use. Preferably, the bight portions of the vertical members of the frame are bound together by light wire or cord and the wire netting or other foraminous covering may be secured in any suitable manner, an infinite number of ways being possible. In practice, however, I should probably secure this covering by means of wires or cords 26 passed about the various frame members and threaded through the netting in the manner shown in the drawing.

Although I have illustrated and described my invention in all its details, it will of course be understood that I do not wish to be limited to such details as various changes, within the scope of the appended claim, may be made at any time, without in the slightest degree departing from the spirit of my invention.

Having thus described the invention, what is claimed as new is:

A plant protector including a frame formed from a single length of wire bent adjacent one end to provide an anchoring eye, further bent in the form of a semicircle with an anchoring eye diametrically disposed from the first, further bent to complete a circular base, then bent upwardly and inwardly from a point adjacent the first anchoring eye and downwardly and outwardly to a point intermediate the anchoring eyes, from said point in close relation to a portion of the base to a point adjacent the second anchoring eye, then upwardly and inwardly and downwardly and outwardly to the base intermediate the anchoring eyes and opposite the first downwardly and outwardly extending portion and then curved to terminate adjacent the first eye, a covering of foraminous material secured about the frame, and an annular ring reinforcing the base and seated at its lower edge portions between certain overlapping portions of the frame.

In testimony whereof I affix my signature in presence of two witnesses.

WILLIAM H. DENKER. [L. S.]

Witnesses:
 THOS. G. GRIFFITH,
 J. P. MARTEN.

Copies of this patent may be obtained for five cents each, by addressing the "Commissioner of Patents, Washington, D. C."